United States Patent [19]

Aab et al.

[11] Patent Number: 4,821,877
[45] Date of Patent: Apr. 18, 1989

[54] SCREW MAGAZINE FOR AN APPARATUS FOR INSERTING AND REMOVING SCREWS

[75] Inventors: Hans W. Aab, Waiblingen; Arnd Kniese, Bad Laasphe, both of Fed. Rep. of Germany

[73] Assignee: EJOT Eberhard Jaeger GmbH & Co. KG, Fed. Rep. of Germany

[21] Appl. No.: 35,626

[22] Filed: Apr. 3, 1987

Related U.S. Application Data

[60] Division of Ser. No. 851,283, Apr. 10, 1986, Pat. No. 4,674,367, which is a continuation of Ser. No. 627,645, Jul. 3, 1984, abandoned.

[30] Foreign Application Priority Data

Jul. 15, 1983 [DE] Fed. Rep. of Germany ....... 3325565

[51] Int. Cl.$^4$ .............................................. B65D 85/24
[52] U.S. Cl. .................................... 206/338; 81/57.37
[58] Field of Search ............... 206/338, 340, 334, 328, 206/348, 57.37, 431

[56] References Cited

U.S. PATENT DOCUMENTS

| | | | |
|---|---|---|---|
| 1,815,594 | 7/1931 | Shaw et al. | 81/57.37 |
| 3,891,014 | 6/1975 | Gunn | 81/57.37 |
| 4,037,267 | 7/1977 | Kisor | 206/328 |
| 4,199,093 | 4/1980 | Combette et al. | 206/338 X |
| 4,326,661 | 4/1982 | Maurer et al. | 206/338 X |
| 4,404,877 | 9/1983 | Mizumo et al. | 81/57.37 |
| 4,533,043 | 8/1985 | Swain | 206/328 |

*Primary Examiner*—Debra Meislin
*Attorney, Agent, or Firm*—Steele, Gould & Fried

[57] ABSTRACT

A portable screwdriver comprises a prime mover and, an apparatus formed as a couplable attachment, which contains the screwing tool on a drive shaft which can be connected to the prime mover. The apparatus carries a magazine receptacle for a strip-like screw magazine from which the screws are pressed under spring tension into an arcuate screw guide, where they are held between two retaining jaws until the screwing tool has taken them up and has released them for insertion purposes by swinging the retaining jaws apart. The apparatus is particularly suitable for self-tapping screws and has a narrow front cross-section, so that it can also be used at otherwise inaccessible points.

The easily replaceable screw magazine comprises a plastic profile with screws guided parallel to one another and at right angles thereto. The screws can be constructed with plastic heads and jamming ribs provided on the heads.

7 Claims, 5 Drawing Sheets

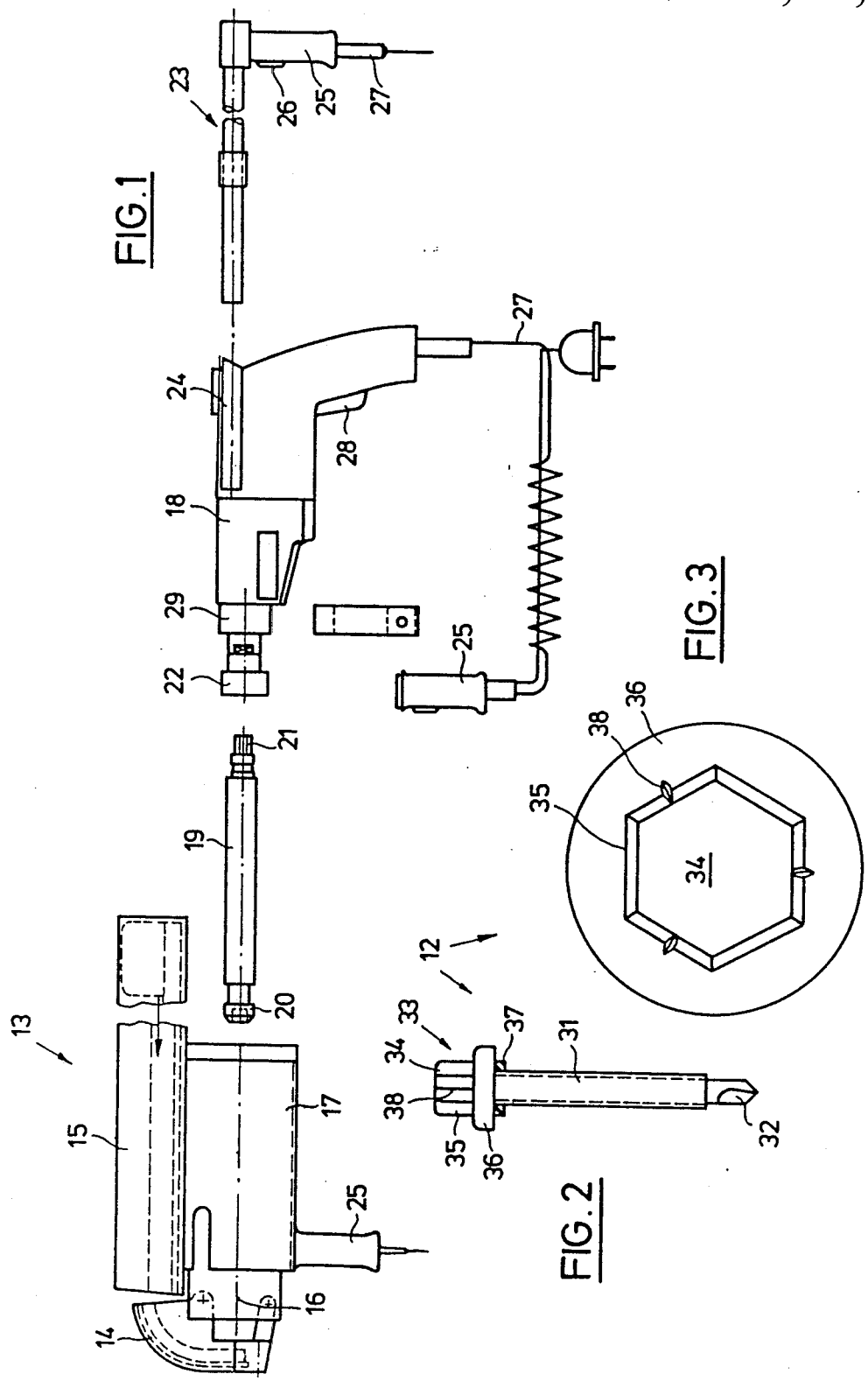

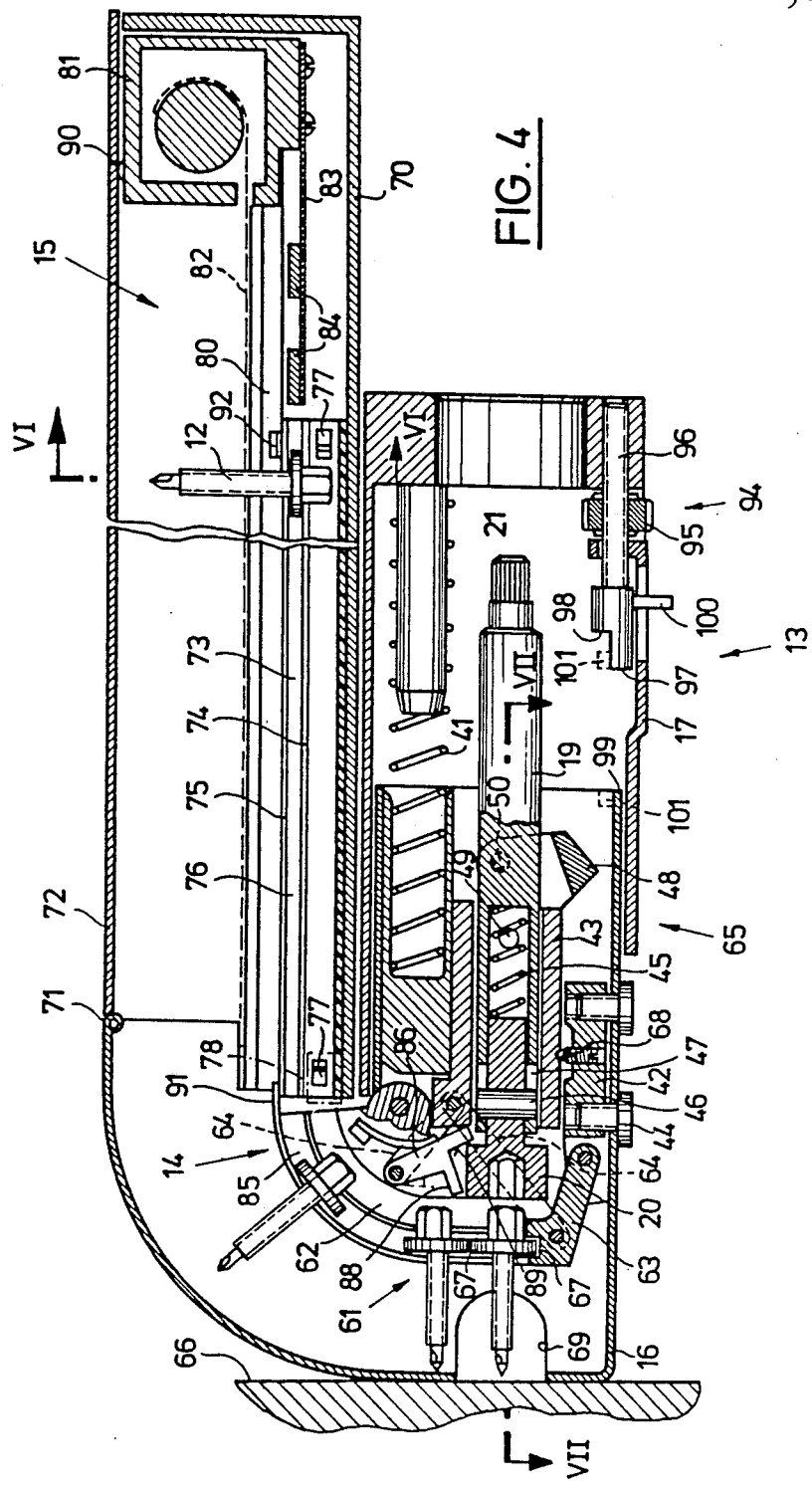

SCREW MAGAZINE FOR AN APPARATUS FOR INSERTING AND REMOVING SCREWS

This is a division of application Ser. No. 851,283, filed Apr. 10, 1986, now U.S. Pat. No. 4,674,367, which is a continuation of application Ser. No. 627,645, filed July 3, 1984, now abandoned.

BACKGROUND OF THE INVENTION

The invention relates to an apparatus for inserting and removing screws, particularly self-tapping screws, with a screwing tool for engaging on a screw head and which is connectable to a drive motor, as well as with an automatic screw supply.

Such apparatuses are used for facilitating frequently repeated screwing processes, in that the screw supply takes place automatically. A preferred field of use is the fixing of roof and wall elements made from sheet metal or other materials, the automatically supplied screws, during insertion, drilling their screw hole and tapping the thread.

Apparatuses have already been proposed in which the screw supply takes place by a plastic strip mechanically indexed by the apparatus and which has cross-like slits through which are placed the screws. During insertion, the screw is torn through this strip and in this way is detached therefrom. However, it frequently occurs that parts of the plastic strip are also torn, become fixed under the screw head or other parts which are to be screwed down and impair the grip of the screw and the sealing of the joint. Following the insertion of the screws, the strip is lost, is prejudicial when working and must be consequently removed again from the site.

In addition, apparatuses with an individual screw supply have been proposed, in which for supply purposes the screws have to be manually thrown into a shaft. Such apparatuses do not make it possible to work on vertical walls or overhead.

SUMMARY OF THE INVENTION

The object of the invention is to provide an apparatus for inserting and removing screws, in which automatic screw supply causes no problem and is possible in any random working position without impairing the screw connection.

According to the invention, this object is achieved in that the automatic screw supply contains a magazine receptacle for a replaceable screw magazine which can be inserted in the apparatus.

The screw magazine, which can preferably be constructed in a substantially linear and strip-like manner, the screws being aligned at right angles to the extension of the magazine and displaceably arranged along the latter with preferably a C-shaped cross-section, and optionally with internal ridges, can consequently easily be inserted in the apparatus and, after emptying, can be removed again by sliding out the screws. It can either by replaced by a new magazine or can be refilled. The magazine is not destroyed and no uncontrollable waste occurs, which is prejudicial to the screw connection. The magazine receptacle can be arranged substantially parallel to the screwing tool axis and it is possible to arrange thereon a screw guide with a deflector for the screws guided at right angles to their transfer direction. Thus, the magazine receptacle causes a minimum of problems and can be arranged for a magazine with a relatively large number of screws. The screws are only swung round by 90° by the deflector shortly prior to their insertion position. The screws, which are preferably slid out of the magazine by a spring-loaded slide run along a similarly shaped guide up to the insertion position.

It is possible to provide in the vicinity of the screwing tool, a retaining device for, in each case, one screw, which is connected to the screw guide and is releasable by the drive mechanism. The retaining device preferably comprises two retaining jaws holding the screws on a flange of the head thereof, said jaws being more particularly mounted so that they can swing away for releasing a screw. Advantageously, the release movement is in or counter to the supply direction of the screws. Thus, prior to the insertion process, the screws are held on their head on the apparatus outside the magazine until the screwing tool has taken them over for guidance purposes and has then released them for insertion. The drive mechanism can be operable by a crank, preferably by means of a double toggle lever drive, as a function of a feed and return movement of the apparatus. Thus, the engagement and release of the screws is brought about independently of the rotary drive of the screwing tool.

Preferably, by means of axially spaced active crank faces, the drive mechanism can initiate the release movement of the retaining device during the feed movement in a different axial relative position between screwing tool and retaining device as compared with the closing movement thereof during the return movement. This ensures that during the feed movement of the screwing tool, the latter engages the screw before the retaining device opens, while during a return movement, the closing movement of the retaining device is delayed to ensure that the screwing tool is not jammed between the retaining jaws of the retaining device.

Advantageously, the apparatus has an engagement device for its locking with the retaining device released. This locking device is important for the retightening of a not-firmly fixed screw, the removal of an e.g. incorrectly or obliquely fixed screw or when working without automatic screw supply.

The apparatus can contain an adjustment device for the screw depth, which is preferably provided between an axially displaceable apparatus front casing and the apparatus part axially fixed to operating handles. It is particularly preferable for the adjustment device to be a stop which is adjustable by means of a thread, optionally two axially spaced stop faces being engageable, as required, with a counter-stop face (for screwing out). The adjustment device can also be provided with an engagement or locking device. The adjustment device operable by means of a thread is used for the fine adjustment of the insertion depth making it possible to insert the screw to a specific depth. For example, this is important if further screws with an underlaid relatively soft packing ring are to be tightened or, for example, a resilient insulation is placed below a roof surface which is to be screwed down and which during tightening was excessively compressed onto a given torque. In addition, a torque-dependent disconnection of the drive motor due to the gyrating mass of the latter can be very considerably dependent on the speed of revolution of the motor and other factors and consequently do not suffice in themselves for limiting the screw insertion process.

Advantageously, the magazine is axially displaceable with respect to the screwing tool, the drive mechanism being operated by this displacement movement. Between the screwing tool and its drive shaft, it is possible to provide an axial displacement with a simultaneous rotary movement. Thus, the preparation for the insertion operation can take place with the prime mover stationary, which is often advantageous for the precise fixing of the screw. The screwing tool can axially give way relative to the drive shaft and is thereby turned by fractions of a revolution, so that it engages with the corresponding key, flat or working surfaces of the screw and does not tilt. Only then is it necessary to switch on the prime mover in order to carry out the actual screwing process.

Preferably, the front casing of the apparatus is connected to a front guide of the screwdriver drive shaft and is resiliently axially displaceable with respect to the prime mover. It is preferably made much narrower in one direction than in the other direction. The apparatus, and in particular its front part engaging on the screw insertion point, is consequently made so narrow that the screwdriver is also suitable for points which are not easily accessible, e.g. when working on the bottom of deep, narrow undulations of roof covering materials. A decisive contribution is made to this narrow profile of the apparatus head by the fact that the retaining jaws of the retaining device move in and not at right angles to the screw supply plane.

The apparatus is advantageously connectable with a detachable connection to a prime mover constructed in the manner of a portable drill. Thus, it is possible to use a conventional, correspondingly designed and geared down prime mover, so that the apparatus with the automatic screw supply can be constructed in the manner of an accessory device. This leads to a unit type construction permitting the use of the prime mover without the accessory device, for example for inserting or removing other types of screw.

It is possible to fit a stick grip, among whose handles arranged at a considerable distance from the prime mover there is preferably a disengageable handle with an electric switch, which can also be connected to the prime mover and/or apparatus and is particularly connected with a switch of the prime mover in "or" circuit manner. As a result of the stick grip, the operator can keep the prime mover in the upright position when working on the ground, e.g. for fixing roof boards to purlins. The handle with the switch and a corresponding feed line to the apparatus is then directly fitted to the stick grip. However, if the stick grip, which is generally fixed to the prime mover is removed, in order to work on horizontal walls or overhead, the handle is removed from an e.g. dovetail guide and when a corresponding guide is fitted to the prime mover or to the apparatus and can be used by means of the switch for putting the prime mover into operation. The handle then serves as a support grip with a switch, so that the fitter can work with only one hand (advantageous when working on scaffolds).

In order that the magazine can be manipulated outside the prime mover and optionally can be removed therefrom in the half-used state, it is advantageous for it to have an optionally resilient locking means at at least one of its ends and which can be overcome by a spring tension moving the screws along the magazine. Another advantageous construction of such a locking means can be detachable by a release mechanism on the apparatus and for this purpose preferably engages in a recess of the magazine. This release mechanism could, for example, comprise a projection, which pressed back a spring-loaded pawl in the magazine provided for locking purposes if the magazine is inserted in the exact position in the magazine receptacle. It would also be conceivable to release a locking means or catch by means of an adhesive tape at the end of the magazine through a cutting blade engaging in the latter. The screws can be guided in the screw magazine and in a screw guide connected thereto by their head and preferably a wide flange edge projecting from said head in facing slots, key faces of the head optionally cooperating with faces in the magazine for protecting the screws against turning. Thus, in this case, the longitudinally easily movable guidance of the screws in the longitudinal direction takes place by means of the flame-like collar between head and screw shank, while the actual screw head containing the key faces makes no direct contribution to this support in the longitudinal direction of the magazine. However, this guide, which for example can comprise facing inner ridges of the magazine, can be so dimensioned that the screws are peripherally fixed between them, which ensures that they are always supplied in a specific position to the screwing tool. The guide on the flange also has the advantage that a shim does not impair the sequencing and guidance in the magazine, because it can be positioned between the free legs of the C. However, it is also possible to guide larger shims on the shank at a certain distance from the head, where they do not prejudice the operation of the apparatus.

The screw magazine can be inserted in the magazine receptacle to be opened at right angles to its longitudinal extension and is advantageously secured there by a spring detent. Thus, after swinging over a cover, the magazine can be inserted from the side, in the same way as a magazine clip, into the magazine receptacle running along the machine. It is possible to provide automatic locking means preventing the operation of the apparatus for the screw supply when the magazine receptacle is in the swung over state.

The magazine receptacle can contain a spring-loaded screw conveying device, which preferably comprises a sliding carriage receiving a coil spring and movable along the magazine receptacle and which has at its front side a flexible slide engaging on the screws. This arrangement only requires minimum space for the arrangement of the spring and makes it possible to easily grip and draw back the sliding carriage for again tensioning the said spring. Since during transfer, the sliding carriage partly moves beyond the magazine, the spring detent for holding the latter can be designed in such a way that when not engaged on a magazine, it prevents the movement of the sliding carriage and consequently automatically prevents operation when a magazine has not been correctly inserted.

It is possible to provide a hold-back device in the vicinity of the retaining device and which, at least during the screw insertion process, can be placed in the path of the screw supply for holding back the next screw to be inserted. It preferably comprises a lever articulated to the retaining device and which has a stop face for the screw head and an operating face operable by the screwing tool for drawing back the stop face from the path of the screws. Thus, this holding-back device ensures that, during the insertion process, the next screw loaded by the spring tension in the screw supply is held back until the screwing tool is again in its reception position opposite to the screw supply. The holding-back device also ensures that the screw received in the screwing tool is not tilted by the lateral pressure of the next screw. Such a tilting is still avoided and additionally good security against accidental removal of the screw from the screwing tool is ensured if a screw is produced with a plastic head having on at least one of its outer or inner key faces a deformable projection projecting beyond the same and which is preferably constructed as a rib parallel to the axial direction of the screw and advantageously fitted substantially centrally on the key face. It gives the screw head an oversize with respect to the screwing tool and its size is dimensioned in such a way that it produces a jamming effect on engaging with the screwing tool. Thus, the plastic rib is flatenned on securing the screwing tool, for example a nut runner on a hexagon head screw, is used for compensating tolerances and jams the screw head on the screwing tool in a predetermined manner. Longitudinal ribs can be provided on three of the total of six key faces in the case of a hexagonal nut, said ribs being dimensioned in such a way that the distance between the facing key face and its apex is certainly somewhat larger than the key dimension of the nut runner.

As a result of the advantageous longitudinal arrangement of the magazine, a relatively large number of screws can be received in a magazine, despite the very narrow profile of the apparatus. If such an important part is not played by the apparatus dimensions in certain cases but instead a larger screw supply must be provided, apart from extending the magazine or a series arrangement of several magazines, it is also possible to provide a special reception and supply means for rapid magazine change. For example, a drum-like magazine receptacle could be connected, in which several magazines are arranged in an indexable manner, or alternatively there could be a slide-like supply means for juxtaposed magazines.

BRIEF DESCRIPTION OF THE DRAWINGS

Features of preferred further developments of the invention can be gathered from the description and drawings. These features and the features of the claims can be realised singly or in random combinations in an embodiment of the invention. Embodiments of the invention are represented in the drawings, wherein:

FIG. 1 is an exloded side view of the individual assemblies of the apparatus with the prime mover.

FIG. 2 is a side view of a screw used in the embodiment.

FIG. 3 is a larger scale plan view of the screw head of the preferred screw.

FIG. 4 is a longitudinal section through the apparatus.

DETAILED DESCRIPTION OF THE PREFERRED EMBODIMENTS

Figure 5:
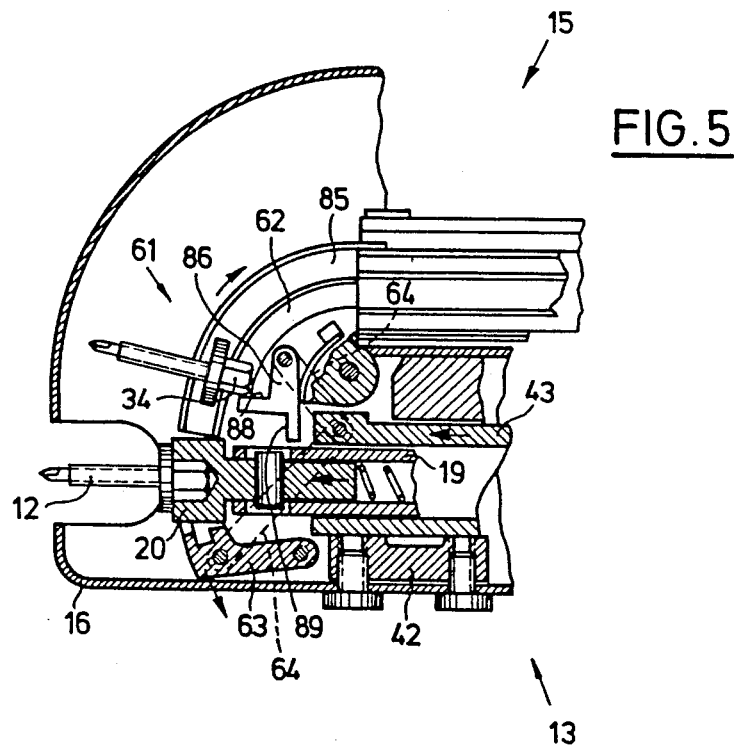
FIG. 5 is a detail of the apparatus in a different working position.

FIG. 1 shows a screwdriver 11 adapted for inserting and removing self-tapping screws 12 (FIGS. 2 and 3), which comprises various assemblies. One assembly is an apparatus 13, which contains a scres supply 14 with a magazine receptacle 15 for a screw magazine and with a front or outer casing 16. This is displaceable relative to a casing part 17, which can be fitted by a conventional portable drill connection (e.g. the so-called Euro connection) to a prime mover 18 which, for a specific portable screwdriver or a conventional portable drill, can be provided with corresponding drive speed reduction, counterclockwise and clockwise rotation, and optionally torque limitation as well.

The screwing tool 20, for example a box spanner with a socket head, is fitted in a manner to be described hereinafter to a drive shaft 19, which is fitted by means of a conventional clutch 21 to the output shaft 22 of prime mover 18. It is possible to optionally interpose overload slip clutches or mechanical torque control clutches.

It is possible to fit to prime mover 18 a stick grip 23, whose front end can be inserted in corresponding receptacles 25 of the prime mover and which is optionally forked at its free end and contains two handles, whereof handle 25 can be provided with an electric switch 26, which is connected into a cable 17, which is either the power supply cable of the prime mover or a separate switching cable. The switch is functionally in "or" circuit arrangement with the master switch 28 of the prime mover, so that the latter can be put into operation by means of switch 26. This can either be brought about by there being a true parallel connection, or can e.g. be mechanically blocked in the case of an electrical series connection of master switch 28, so that there is still an effect of an "or" circuit, despite the electrical series connection.

Handle 25 is connected by means of a detachable connection, e.g. a dovetail connection, to stick grip 23 and can also be fitted to other points of screwdriver 11, for example in the manner shown to casing part 17 of the apparatus 13, or to the prime mover 18, e.g. by means of an adaptor 30 jammed onto connection neck 29, the adaptor being fitted there if the prime mover is used without apparatus 13.

Thus, the screwdriver comprises individual assemblies, which can be used in very varied manners. Through the replacement of certain apparatus parts, for example the screw supply 14, magazine receptacle 25, screwing tool 20, etc, it can be adapted to the most varied requirements, e.g. to different screws, shapes or operating conditions.

FIGS. 2 and 3 show a self-tapping screw 12, which can be preferably inserted by means of the apparatus. The screw has a threaded shank 31 and an auger bit 32 with dimensions roughly corresponding to the core diameter of the thread. The shank and the bit are made from hardenable steel and at least the bit is hardened. Plastic is injected round the screw head 33 and comprises a hexagon portion 34 with key faces 35 and a round collar or annular flange 36 connected thereto and whose face facing the shank forms the strip face for the head. A ring gasket 37 is underlaid in the represented embodiment.

FIG. 3 is a plan view of screw head 33. It is apparent that in the case of three of the total of six key faces 35, there is a rib 38 with a triangular cross-section projecting over the screw height in the centre of the key face. The rib is dimensioned in such a way that it can deform in conjunction with the corresponding screwing tool (hexagon nut) receiving the hexagon portion, i.e. the tip of the rib is deformed or moved away when the screw is inserted in the screwing tool. This on the one hand ensures a tolerance compensation, which ensures a particularly good engagement of the key faces on the tool, and on the other hand the screw head is held in the tool in such a way that it does not tend to tilt under lateral loading, so that there is no tendency for the screw to become laterally detached. In addition, the screw is held in the tool and cannot fall out. It is shown in the present embodiment, that a key face provided with a rib always faces one without a rib. This is particularly advantageous, because then a key face is particularly well pressed. However, another arrangement is also possible, for example the provision of a projection on each key face e.g. on only one key face. In place of the ribs, it is also possible to provide other types of projections, e.g. lug-like projections, which need not necessarily be in the center of a key face. In the case of a different screw head configuration, for example in the case of internal hexagon screws, projections can be used in a comparable manner. A condition for the dimensioning is that the projections or ribs are sufficiently high to bridge the tolerance clearance between the dimensions of the screwing tool and the head and have a certain oversize with respect thereto, while being dimensioned and shaped in such a way that the particular oversize resulting from the tolerance can be displaced or deformed. In the case of a rib, this is for example possible in the lateral direction and in the case of a single projection also in the axial direction of the screw. Thus, the dimensions are also dependent on the nature and hardness of the plastic of the head. In the case of internal hexagon screws, it is necessary to have an undersize with respect to the external key dimension of the screwing tool between the projections.

FIGS. 4 to 8 show the apparatus 13 in detail. The casing part 17, fixable by means of a connecting collar 40 to the connecting neck 29 of prime mover 18, overlaps and guides the front casing 16 axially displaceable with respect thereto counter to the tension of a spring 41. Front casing 16 contains a guide piece 42 with a central bore, in which is arranged a guide sleeve 43. Guide piece 42 is screwed by means of screws 44 to the front casing and these permit a rough reciprocal setting of these two parts over a given screw length.

Drive shaft 19 is mounted in a rotary and axially displaceable manner in the bore of the guide sleeve. The front of shaft 19 pointing to the left in FIG. 4 receives in a bore the shank of a screwing tool 20 in the form of a hexagonal box, which can be moved into the drive shaft in opposition to the tension of a spring 45. A transverse pin 46 projects through the shank of screwing tool 20 and runs in a corresponding sloping slot 47 of the sleeve. If screwing tool 20 is forced into the drive shaft counter to the tension of spring 45, this axial displacement is converted by pin 46 and slot 47 into a rotary movement of the screwing tool, which consequently finds its engagement position on the screw head.

Figure 7:
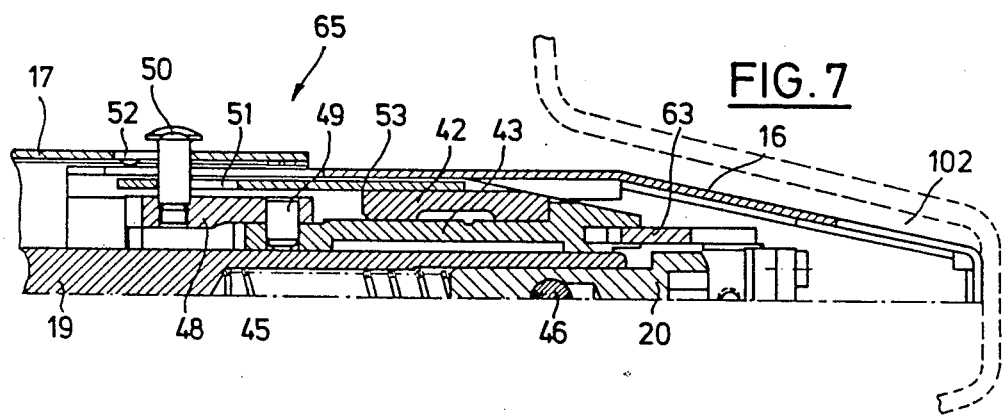
FIG. 7 is a section along line VII of FIG. 4.

A substantially U-shaped transfer stirrup 48 is pivotably articulated about axle pins 49 on guide sleeve 43 (cf also FIG. 7). On either side, a guide bolt 50 engages through two cooperating cranks 51, 52 in the form of slots. Crank 51 (inner crank) is provided on a crank plate 53 on each side of guide piece 42, while crank 52 (outer crank) is cut out of the casing part 17.

Figure 8:
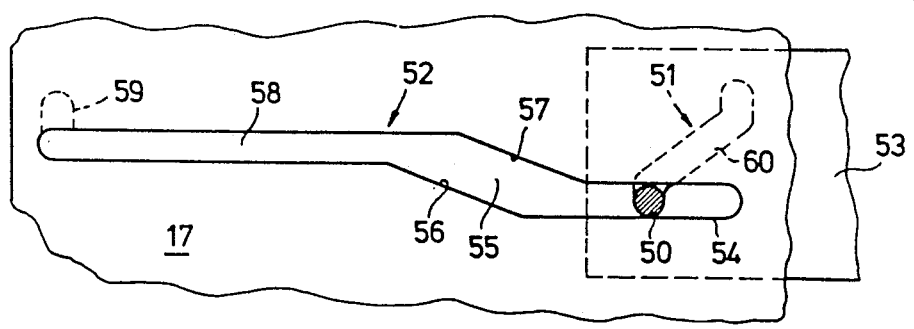
FIG. 8 is a view of a drive mechanism crank.

The cooperation of the two cranks is apparent from FIG. 8. Following onto its initial portion 54, outer crank 52 has an upwardly sloping switching portion 55, whose two boundary faces 56, 57 are further away from one another than corresponds to the diameter of guide bolt 50. This is followed by a long non-sloping portion 58, to whose end can be connected a locking portion 59 emanating at right angles from portion 58 and as indicated by broken lines.

The inner crank 51 has a flat Z-shaped configuration, whose switching portion 60 has an opposite slope to portion 55.

Two retaining jaws 62, 63 which, together, form a retaining device 61, are pivotably articulated to guide piece 42 and belong to the screw supply 14. They are connected in an articulated manner to the guide sleeve 43 by means of two connecting levers or tie rods 64 arranged at an angle to one another, so that in the case of an axial displacement of guide sleeve 43, a double toggle lever mechanism is formed, which pivots the two retaining jaws out of their closed position shown in FIG. 4 in to the open position shown in FIG. 5. The drive mechanism 65 for the retaining device comprising connecting lever 64, guide sleeve 43, the transverse stirrup with guide bolt 50 and the two cranks 51, 52 operates in the following way. In the case of a displacement of front casing 16 relative to casing part 17 fixed to the prime mover, and resulting from the front casing part 16 being pressed against a face 66 of an object into which a screw 12 is to be inserted, the screw 12, which is supplied in a manner to be described hereinafter and held by its collar 36 in corresponding guide slots 67 of the closed retaining jaws 62, 63 is engaged with the screwing tool 20, because the latter is connected to the drive shaft guided axially through the prime mover and is consequently moved to the left relative to front casing 16. The mounting support of screwing tool 20 in the drive shaft, which is axially displaceable under spring tension, permits a resilient pressing of the screwing tool on the head and the simultaneous rotation of said tool permits a reliable engagement of tool and screw head. During this movement, the guide bolts 50 run in the initial portions 54 of crank 52. On reaching the area of switching portion 54, they run upwards on guide face 56 and correspondingly move in crank 51 along switching portion 60. Thus, transfer stirrup 48 is simultaneously pivoted and is displaced axially to the left with respect to the guide piece 42, so that by means of the connecting levers 74, the two retaining jaws 62, 63 are swung away from one another and the collar 36 of the screw held between them is released. A spring detent 68 can be provided, which resiliently fixes the end positions of the retaining jaws, even independently of the crank, in order to keep them in a clearly defined position.

When screw 12 is released by the retaining jaws, under the tension of spring 45 it can move forwards until it strikes against face 66. The setting of the front face of front casing 16 which has a corresponding cutout 69 for the screw, is normally chosen in such a way that this path of the screw is relatively short. Thus, however, the rapid advance can be desired, in order to achieve a certain punch marking with the hardened auger bit 32.

Only now is it necessary to switch on the prime mover. Under the pressure exerted by the operator, the self-tapping screw enters face 66 guide bolts 50 running in crank portion 58. If a locking portion 59 is provided, as a result of a pivoting inwards performed from the outside, the guide bolt 50 can be locked in a retracted position in the locking portion of front casing 16, in which the retaining jaws are open and the screwing tool is relatively easily accessible. In this position, it is possible to retighten screws, remove screws (during the return of the prime mover) or introduce, without automatic supply, screws individually manually inserted from the front. During the return of the screwing tool 20, the guide bolts 50 run along the guide face 57, which has a larger axial spacing from guide face 56 than corresponds to the guide bolt diameter. Thus, the retaining jaws are only closed, if the screwing tool has definitely been retracted from the area thereof, so that it cannot be jammed.

Figure 9:
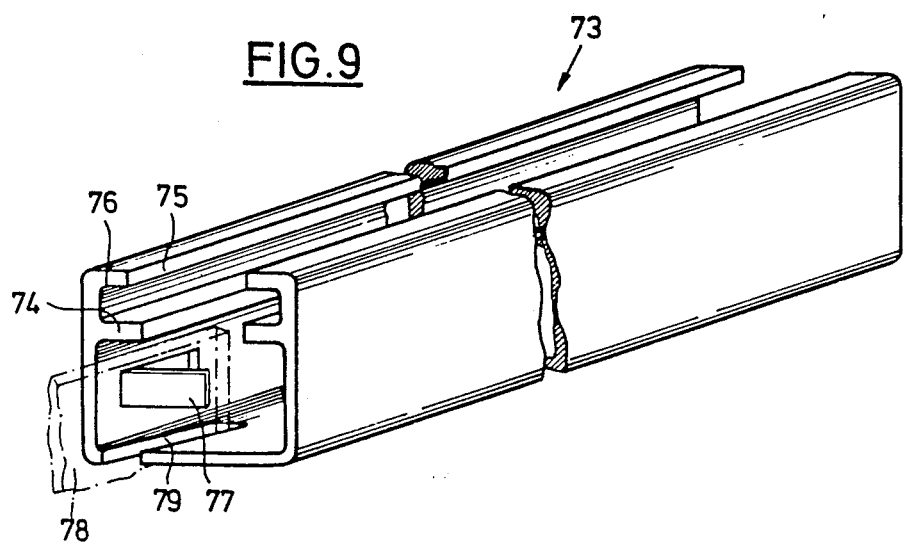
FIG. 9 is a perspective view of a screw magazine.
Figure 6:
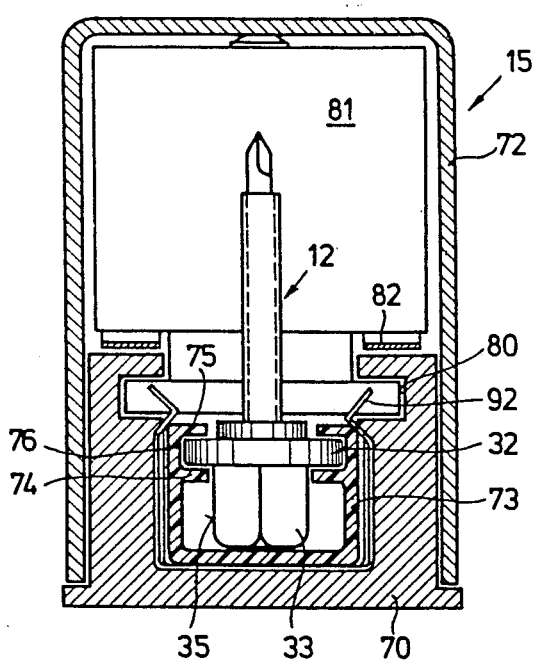
FIG. 6 is a detail through the magazine receptacle according to line VI of FIG. 4.

FIGS. 4 and 9 show the screw supply 14 and the magazine receptacle 15. The latter comprises a receptacle casing 70, which is closed by a cover 72 pivotably articulated by means of a hinge 71. Within the inner area enclosed by the cover is placed a magazine 73, which comprises a linear, elongated profile rail, whose cross-sectional shape can be described as a C or box with a longitudinal slit on one of its long sides. Two inner ridges or shelves 74 project towards one another in the inner space parallel to the free leg portion 75 of the C, so that two parallel slots are formed, between which the screw collar 36 is guided in an easily movable manner. The reciprocal spacing of the two ridges is such that it is somewhat larger than the key width of the head, but is smaller than the associated diagonal dimension. Thus, although the screws are easily movable in the longitudinal direction, they are non-rotatable about their own axis. At either end is provided a securing or locking means 77 against the unintentional dropping out of the screws, if the magazine is removed in the half-full state or loaded. This locking means comprises a shackle or clamping lug, which is cut from the plastic profile material and bent inwards. In the present embodiment, this shackle is so fitted in the vicinity of one side face of the magazine, that it cooperates with the screw head and prevents the sliding out of screws in barb-like manner because, although fitted in the vicinity of the end of the magazine, it points inwards. As shown by dot-dash lines in FIGS. 4 and 9, the magazine receptacle contains a release mechanism 78 in the form of a ledge-like projection which, when the magazine is inserted, projects into the interior thereof and forces back the locking tab on the removal side of the screws. However, it is also possible to make the locking tab so narrow, that it is turned over by the screw transfer force, or to provide any other resilient securing means. The bottom of the magazine has a corresponding recess 79 to enable the release mechanism to be brought into this position during the insertion. The ledge for the release mechanism 78 is thinner than the spacing between the screw head and the magazine wall, so that it does not prejudice the removal of the screws.

A carriage guide 80 for a drive carriage 81 is arranged in the magazine receptacle, which is parallel to the screwdriver shaft axis and is so arranged that it can project beyond the prime mover. Sliding carriage 81 comprises a casing, which receives a coil spring 82, which is fixed to the front or left-hand end of the magazine receptacle. Such conventional coil springs attempt to assume their wound-up state and consequently act as tension springs. On a flexible, forwardly projecting strip 83 on the sliding carriage are provided blocks or ledges acting as slides 84, which engage into the magazine in the magazine receptacle and are guided in slots 76. The strip-like slides consequently press on the collar of the last screw in the magazine and move the screws out of the magazine into a deflector 85, which comprises two arcuate slots, corresponding to slots 76 and are arranged on the sector-like retaining jaw 62.

The screws arranged in the magazine at right angles to the screwdriver axial direction are deflected there by 90° and are forced through until they are stopped by the retaining jaw 66, which also has slots corresponding to slots 76, but which are so interconnected in arcuate manner that a semicircular annular groove is formed, which receives the collar 36 and accurately guides the screw during the mounting of the screwing tool. A second slide 84 of the same type is fixed to strip 83 and ensures that the flexible strip is guided round the deflector 85 which, together with the corresponding length of strip 83, ensures that the last screw can be pressed from the screw supply under spring tension into its insertion position.

A hold-back device in the form of a lever 86 is articulated to retaining jaw 62 and is loaded clockwise by a leaf spring 87 and has a stop face 88 and an operating face 89, in each case in the form of projecting members.

FIG. 4, which shows the retaining jaws in the closed position, makes it apparent that the operating face is so loaded by the screwing tool in its retracted inoperative position, that the lever forming the hold-back device 86 is pivoted counterclockwise and counter to the spring from the path of screws 12, so that the screws are moved on the deflector into the insertion position.

If, as shown in FIG. 5, after opening the retaining jaws and advancing the screwing tool, the operating face releases lever 86, its stop face 88 projects into the screw path and secures the screw head 34 of the next screw, so that it initially no longer presses against the collar of the screw received in said tool and can tilt the latter and cannot engage with the screwdriver shaft.

On driving carriage 81 is provided a locking knob 90, which is to be operated in order to bring about the screw advance. The magazine can easily be replaced by placing it in the screw receptacle with its back towards the apparatus and with screws projecting therefrom, so that it engages on the front side under a projection 91 of the segmental retaining jaw 82 and is positively secured. At the rear end is provided a bow-shaped retaining spring 92, which engages with a spring detent over the magazine strip. If there is no magazine therein, this retaining strip moves so far inwards that carriage 81 also cannot advance on the guide path 80 and is consequently blocked.

The length of the feed movement of front casing 16 relative to casing part 17 can be adjusted by an adjustment device 94, which represents an insertion depth limitation. For this purpose, casing part 17 carries a screw spindle 96 adjustably guided by a knurled nut 95 and which has at one end stop faces 97, 98, which are displaced relative to one another in two stages and which cooperate with the edge 99 of the front casing for blocking purposes. By means of a reversing lever 100, screw spindle 96 can be pivoted in such a way that one of the stop faces 97, 98 comes into action. Normally, the stop face 97 limiting a smaller insertion depth is engaged. However, if exceptionally deeper screw insertion is required, there is no need to vary the fine adjustment by means of knurled nut 95 and instead reversing lever 100 engages stop face 98, which gives a few millimeters more insertion depth. Moreover, a locking projection 101 can be provided both on edge 99 and screw spindle 96 and these cooperate with one another in a third position of reversing lever 100 and block the apparatus in its inserted position, so that the same effect is obtained as through the locking portion 59.

It is apparent that an apparatus is obtained that makes it possible to provide a screw connection, even at such inaccessible points as in a trapezoidal recess 102 (FIG. 7), including rough drilling, this taking place in one operation with automatic screw supply.

The vital advantages of the apparatus result from the fact that all the functions take place in a purely path-controlled manner. The operating forces are small. The magazine remains outside the screw insertion area and is not damaged or destroyed. Due to the good adjustability to the particular screw length, idle movements are avoided in the case of short screw lengths. Magazines can be replaced very quickly and usually in the operating position of the apparatus, it being advantageous that when replacing the magazine for a few screws to be present in the screw supply, particularly in the deflector. Thus, magazine change need not take place at a particular time, but can in fact happen a few operating strokes before the last screw has been consumed. Not only in the magazine, but also on the further path to the insertion point, the screws are covered by casing parts, so that they cause no problem when working with the apparatus. The apparatus makes it possible to operate with different screws, e.g. also internal socket or cross-head screws by merely replacing the screwing tools and/or the magazines, as well as optionally screw guidance parts.

Figure 10:
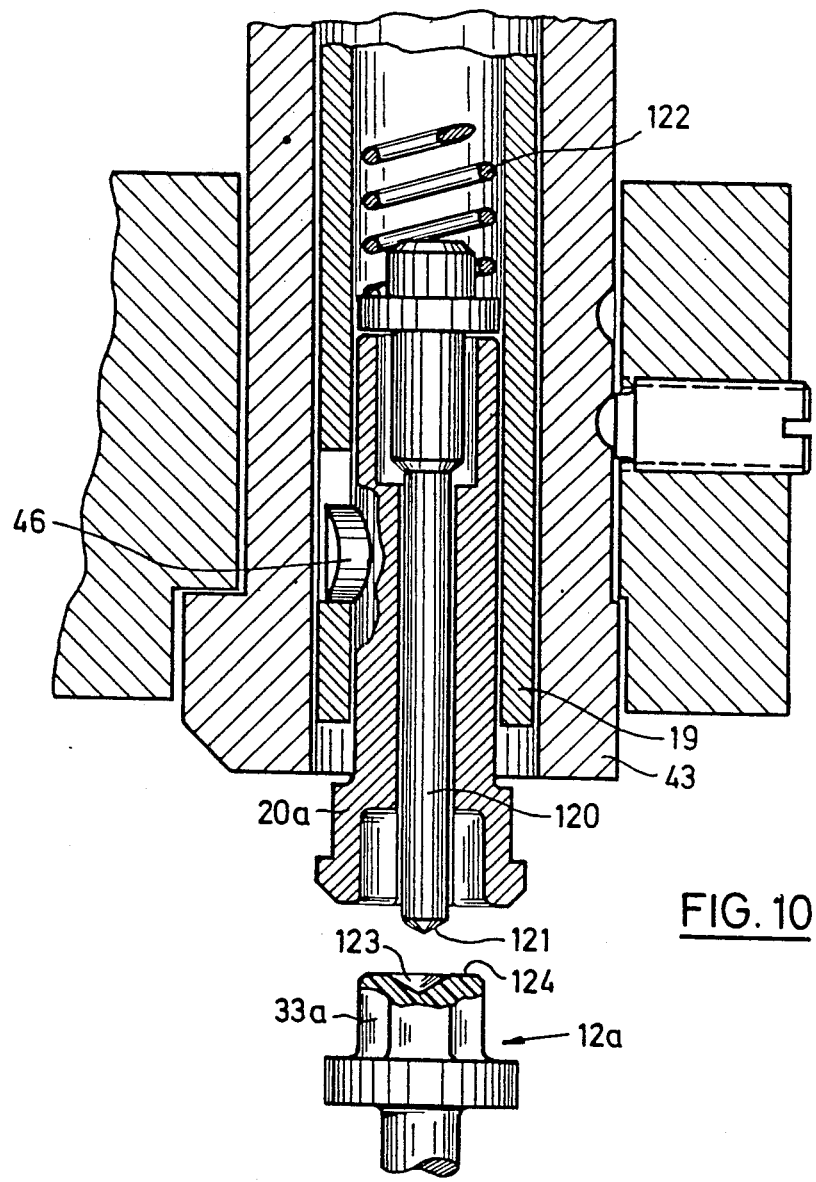
FIG. 10 is a detail through a screwing tool and a screw.

FIG. 10 shows a screwing tool 20a, which corresponds to that of FIG. 4, but whose shaft is hollow and receives a centering pin 120 which is pressed by a spring 122 into the position shown in FIG. 10. It has a steep conical end 121 which cooperates with a corresponding recess 123 on the end face 124 of a screw head 33a for centering screw 12a. On mounting the screwing tool 20a, the centering pin with end 121 enters recess 123 and centers screw 12a relative to screwing tool 20a and does not impede the insertion rotation of the latter. The centering pin is then forced back counter to spring tension, whilst the screw is inserted in the screwing tool.

What is claimed is:

1. A screw magazine for an apparatus for inserting and removing screws, each screw having a head, a laterally protruding flange and an at least partly threaded shaft, the magazine comprising:
   an elongated housing extending linearly along a line of extension and having a bottom wall and opposing side walls defining an elongated compartment in which the heads of a plurality of screws can be aligned one behind the other, with their shafts at right angles to the line of extension of the housing,
   the elongated compartment including a guide compartment and a head compartment adjacent to the guide compartment, the guide compartment bearing against the flanges of the screws and having an inner shelf and a free leg portion on each opposing side wall of the guide compartment extending laterally therefrom, said inner shelves and free leg portions partly enclosing around the flanges and guiding the screws by said flanges on a path of movement of the screws along a length of the housing,
   the head of the screws compartment containing the heads and comprising a clamping lug cut out of the housing and bent into the head compartment, thereby extending into the path of movement of the screws,
   the clamping lug being engagable by a release mechanism of the apparatus upon inserting the magazine into the apparatus, whereby the lug is bent out of the path of movement.

2. A screw magaine according to claim 1, wherein a lug is provided at both ends of the compartment.

3. A screw magazine according to claim 1, wherein the inner shelves and free leg portions define two facing slots.

4. A screw magazine according to claim 1, wherein the inner ridges and free leg portions are operable to guide a flexible pusher means of a spring acted transport means of the apparatus for moving the screws along the path of movement.

5. A screw magazine according to claim 1, wherein the lug is directed at an angle to the inside of the compartment and to the center of the magazine, thereby forming a resilient barb-like holding means for a head of an endmost screw.

6. A screw magazine according to claim 1, wherein the lug is disposed in the magazine such that as screws are inserted into the magazine the lug is resiliently displaced by each screw passing the lug when being inserted into the magazine, and the lug closes behind each said screw by snap-action.

7. A scres magazine for an apparatus for inserting and removing screws, each screw having a head, a laterally protruding flange and an at least partly threaded shaft, the magazine comprising:
   an elongated housing extending linearly along a line of extension and having a bottom wall and opposing side walls defining an elongated compartment in which the heads and the flanges of a plurality of screws can be aligned one behind the other, with their shafts at righ angles to the line of extension of the housing,
   the elongated compartment including a guide compartment and a head compartment adjacent to the guide compartment, the guide compartment defining an elongated slot through which the shaft of each said screw extends, and an inner shelf and a free leg portion on each opposing side wall of the guide compartment extending laterally thereto, said inner shelves and said free leg portions partly enclosing around the flanges and guiding the screws by the flanges on a path of movement of the screws along a length of the housing,
   the head compartment comprising a clamping lug cut out of the housing and bent into the head compartment, thereby extending into the path of movement of screws, the head compartment dimensioned to encompass the heads while the screws are guided by the flanges,
   the clamping lug being engaged by a release mechanism of the apparatus upon inserting the magazine into the apparatus, whereby the lug is bent out of the path of movement and the screw magazine feeds a replaceable stock of screws into the apparatus from outside.

* * * * *

UNITED STATES PATENT AND TRADEMARK OFFICE
CERTIFICATE OF CORRECTION

PATENT NO. : 4,821,877
DATED : April 18, 1989
INVENTOR(S) : Hans W. Aab

It is certified that error appears in the above-identified patent and that said Letters Patent is hereby corrected as shown below:

Column 6, line 1, delete "scres" and insert --screw--.

Column 6, line 19, delete "25" and insert --24--.

Column 6, line 22, delete "17" and insert --27--.

Column 6, line 44, delete "25" and insert --15--.

Column 12, line 31, delete "scres" and insert --screw--.

Column 12, line 40, delete "righ" and insert --right--.

Signed and Sealed this

Seventh Day of April, 1992

Attest:

HARRY F. MANBECK, JR.

*Attesting Officer*   *Commissioner of Patents and Trademarks*